US005484675A

United States Patent [19]
Tripp et al.

[11] Patent Number: 5,484,675
[45] Date of Patent: Jan. 16, 1996

[54] TONER COMPOSITIONS WITH HALOSILANATED PIGMENTS

[75] Inventors: Carl P. Tripp, Burlington; Richard P. N. Veregin, Mississauga; Michael F. Cunningham, Georgetown; Thomas E. Enright, Whitby; Maria V. McDougall, Burlington, all of Canada

[73] Assignee: Xerox Corporation, Stamford, Conn.

[21] Appl. No.: 308,175

[22] Filed: Sep. 19, 1994

[51] Int. Cl.⁶ ........................................... G03G 9/09
[52] U.S. Cl. ...................... 430/106; 430/106.6; 430/110
[58] Field of Search ................... 430/106, 106.6

[56] References Cited

U.S. PATENT DOCUMENTS

| | | | |
|---|---|---|---|
| 2,618,552 | 6/1951 | Wise | 430/120 X |
| 3,526,533 | 9/1970 | Jacknow et al. | 430/108 X |
| 3,872,032 | 3/1975 | Kanemaru et al. | 423/489 |
| 3,925,263 | 12/1975 | Ukaji et al. | 423/489 |
| 4,247,608 | 1/1981 | Watanabe et al. | 429/194 |
| 4,524,119 | 6/1985 | Luly et al. | 430/108 |
| 4,762,763 | 8/1988 | Nomura et al. | 430/110 |
| 5,028,501 | 7/1991 | Ritt et al. | 430/29 X |
| 5,275,901 | 1/1994 | Anno et al. | 430/110 X |
| 5,278,016 | 1/1994 | Fuller et al. | 430/109 |

*Primary Examiner*—Roland Martin
*Attorney, Agent, or Firm*—E. O. Palazzo

[57] ABSTRACT

A toner composition comprised of resin and pigment particles where the pigment particles are treated with a fluorosilane polymer.

29 Claims, No Drawings

TONER COMPOSITIONS WITH HALOSILANATED PIGMENTS

BACKGROUND OF THE INVENTION

The invention is generally directed to pigments, such as toner pigments, and, more specifically, to processes for the preparation thereof. In embodiments the present invention relates to toner and carrier particles with fluorinated, especially fluorosilanated pigments, such as fluorinated carbon blacks obtained, for example, by solution or gas phase methods. The pigments obtained with the processes of the present invention can be selected as a component for carrier coatings, or as a toner component. Although it is not desired to be limited by theory, it is believed that the fluorination passivates the pigment. The fluorinated pigments obtained with the process of the present invention possess a number of important characteristics, such as increased negative charging, compared to the untreated pigment. Thus, the pigments, such as for example the fluorosilanated carbon black, that result from the treatment process have about −0.1 to about −1.0 volt more negative contact potential than the corresponding untreated pigments. In applications, such as for toner or carriers, where these treated pigments are used in carrier coatings or in toners the negative charging of the carrier or toner can be increased by 5 to 30 microcoulombs per gram compared to the carrier or toner with untreated pigments. The charging level, as determined by the contact potential, or by the toner or carrier charge, can be selected by controlling the fluorosilane content of the fluorosilanated pigment, whereby the charge level of the fluorosilanated pigment becomes increasingly more negative as the amount of fluorosilane on the pigment increases, and as the length of the fluorosilane chain increases. The fluorosilane concentration can be varied, from about 5 weight percent of the pigment to about 90 weight percent of the pigment, and the length of the fluorosilane chain can be vaned to contain from about 1 carbon atom to about 30 carbon atoms. Thus, when the toner resin is changed, when toner additives are added, such as waxes, when the pigment is changed, or when the carrier composition is changed with the fluorosilanation process it is possible to vary the pigment treatment, which enables the overall charge to remain constant. With toners that incorporate different pigments, it is possible to fluorosilanate all of the pigments, and also by varying the fluorosilane treatment, all of the resulting toners with the different pigments will have the same or similar toner charge. This enables very simple construction of the electrophotographic or xerographic apparatus that makes use of more than one toner color. The charge can be varied without affecting the conductivity of the pigment, or charge control agent particles. This is important for maintaining high conductivity in the coated carrier. This is also important with toner additives, such as charge control agents, where the conductivity of the additive must be maintained. There is also the advantage with the present invention that there is no change in other important properties of the pigment, such as color, particle size or the conductivity of the pigment particle. Further, since the fluorine does not react with the pigment, the fluorination process can be applied to conductive or nonconductive particles, color or black pigments, doped tin oxide, metal particle, wax, charge control agent particles, or toner particles. Since the pigment treatment is accomplished at temperatures that are close to room temperature, there is no degradation of the pigment due to high temperatures. The pigment that is selected may be one that is unstable at elevated temperatures, that is above room temperature. For example, X-copper phthalocyanine pigment listed in the Color Index as CI 74160 is only stable to about 150° C. for 30 minutes, while a monoazo pigment identified in the Color Index as CI 12700, CI Solvent Yellow 16, decomposes at temperatures of 100° C.

For carrier particles, the fluorosilanated pigment, such as carbon black, has the advantage that the charge of the carrier can be varied by 5 to 30 microcoulombs per gram of toner particles by varying the fluorosilanation treatment of the pigment, whereby the charge level of the fluorosilanated pigment becomes increasingly more negative as the amount of fluorosilane on the pigment increases, and as the length of the fluorosilane chain increases, and charge can be varied without any variation in the conductivity of the carbon black. It is an important property of the carrier to have a specific conductivity that is determined by the specific xerographic or electrophotographic process in which the carrier is utilized to effectively function in that process, and wherein the conductivity of the carrier is determined by the carbon black and by the amount of the carbon black incorporated into the carrier coating, and to provide to the toner a specific charge level, typically of between about 10 and about 40 microcoulombs per gram of toner. It is also desirable to enable varying the charging level of the carbon black to accommodate any changes in the toner properties without any change in the carrier conductivity, which would reduce the function of the combination of carrier and toner as, for example, resulting in long charging times of greater than about 5 minutes.

For toner particles, the fluorosilanated carbon black has the advantage that the charge of the toner can be varied by 5 to 30 microcoulombs per gram, as measured by the known Faraday Cage blow-off tribo method. The fluorosilanation treatment can be varied as indicated herein, whereby the charge level of the fluorosilanated pigment becomes increasingly more negative as the amount of fluorosilane on the pigment increases, and as the length of the fluorosilane chain increases, and the toner charge can be varied without any variation in the conductivity of the carbon black. The conductivity of the toner is primarily determined by the pigment, such as carbon black, and by the amount of the carbon black incorporated into the toner. With the present invention, there is enabled in embodiments a variation in or preselection of the charging level of the carbon black to accommodate any changes in the other components of the toner, such as for example wax, changes in the composition of the toner resin, or to accommodate changes in the carrier composition without any change in the toner conductivity, which would reduce the function of the combination of carrier and toner as, for example, resulting in long charging times of greater than about 5 minutes, or in broad charge distributions, as when the width of the distribution of toner charge is approximately equal to or greater than the absolute magnitude of the average charge.

In the prior art as illustrated in U.S. Pat. No. 4,524,119, the fluorination occurs at high temperatures, 150° to 600° C., in the gas phase, and involves a reaction of the elemental fluorine with reactive bonds of the carbon black. This fluorination is applied to the entire bulk of the sample, changing the properties of the carbon black itself. As indicated in this patent, the fluorination changes the charging level, and increases the resistivity of the carbon black. Thus, it is not believed possible to separately change the charge and the conductivity since the fluorine reacts with the carbon black, and the process is substantially different for each carbon black. This prior art is only applicable, it is believed, to conductive particles that have reactive bonds, and thus can be used with carbon black, but could not be used with other conductive particles, such as doped tin oxide metal particles. Furthermore, the fluorination treatment of the above prior art is accomplished at elevated temperatures which would decompose or degrade many materials like color pigments, organic charge control agents, and toner particles, disadvantages avoided or minimized with the present invention. Also, because of the very reactive nature of the prior art process, the color of the pigment would change. For example, pigments, such as diazo dyes identified in the Color Index as CI 26050, are unstable at high temperatures; CI Solvent Red 19 is only stable to about 100° C.; X-copper phthalocyanine pigment listed in the Color Index as CI 74160 is only stable to about 150° C. for 30 minutes; and CI Solvent Yellow 16, decomposes at temperatures of 100° C. When a charge control additive component or CCA particle is to be treated, it is usually necessary to retain the particle intact to prevent or minimize agglomeration. Thus, it is necessary to retain the temperature of the treatment process below the melting temperature of the CCA. Thus, cetylpyridinium chloride, for example, melts at about 85° C. When a toner particle is to be treated, it is usually necessary to retain the toner particles intact to prevent or minimize agglomeration. Thus, it is important to retain the temperature of the treatment process below the flowing temperature of the toner, which is usually about or below the toner glass transition temperature, which is generally between about 40° C. and about 65° C. With the fluorosilane product and treatment of the present invention, treatment is near or at room temperature in embodiment, and thus no degradation, melting, or flow of pigments, CCAs or toner particles results. The above mentioned pigments, toners, and charge control agents are incompatible with the processes of the prior art U.S. Pat. No. 4,524,119, which require higher temperatures of 150° to 600° C., which would be above the stable temperature for these materials.

Other patents illustrating the preparation of fluorinated carbon, include U.S. Pat. Nos. 2,786,874; 3,925,592; 3,925, 263; 3,872,032; and 4,247,608.

To attain negative charging in a carrier or toner would normally require adding an additional component to the carrier (toner), or even changing the resin. A much simpler and more economical design approach developed after extensive research is to fluorosilanate one (or more) existing materials, thereby achieving the desired charging properties without having to make carrier or toner design changes. The toner and developer compositions of the present invention can be selected for electrophotographic, especially xerographic imaging and printing processes, including color processes.

Toner pigments and coated carriers with carbon black polymer mixtures are known, reference for example U.S. Pat. No. 4,221,856, which discloses electrophotographic toners containing carbon black and resin compatible quaternary ammonium compounds in which at least two R radicals are hydrocarbons having from 8 to about 22 carbon atoms, and each other R is a hydrogen or hydrocarbon radical with from 1 to about 8 carbon atoms, and A is an anion, for example, sulfate, sulfonate, nitrate, borate, chlorate, and the halogens, such as iodide, chloride and bromide, reference the Abstract of the Disclosure and column 3; a similar teaching is presented in U.S. Pat. No. 4,312,933 which is a division of U.S. Pat. No. 4,291,111; and similar teachings are presented in U.S. Pat. No. 4,291,112 wherein A is an anion including, for example, sulfate, sulfonate, nitrate, borate, chlorate, and the halogens.

Also, there are disclosed in U.S. Pat. No. 4,338,390, the disclosure of which is totally incorporated herein by reference, developer compositions containing as charge enhancing additives organic sulfate and sulfonates, which additives can impart a positive charge to the toner composition and which toner contains pigments like carbon black, cyan, magenta, yellow, and mixtures thereof. Further, there are illustrated in U.S. Pat. No. 4,298,672, the disclosure of which is totally incorporated herein by reference, positively charged toner compositions with resin particles and pigment particles like carbon black, and as charge enhancing additives alkyl pyridinium compounds. Additionally, other documents disclosing positively charged toner compositions containing resin and pigment like carbon black, and which toners also contain charge control additives include U.S. Pat. Nos. 3,944,493; 4,007,293; 4,079,014 4,394,430, and 4,560, 635 which illustrates a toner with a distearyl dimethyl ammonium methyl sulfate charge additive.

U.S. Pat. No. 5,278,016 discloses the preparation of halogenated toner particles. The halogen changes the chemical nature of the surface layer of the toner particles. The preparation of the halogenated surface layer depends on the presence of certain reactive groups on the toner particle surface, which react in the presence of the halogenating agent. This process is applicable to toners, or other materials, with such surface groups present. If the material to be treated by this process, do not have the reactive group present, then the halogen does not become affixed to the surface of the material, and sufficient halogen may not be present on the material after the treatment to provide substantial change in the charging of the material. The halogenation process of the prior art does not result in a general increase in negative charging of the toner surface after reaction with the halogenating agent, but does show a general reduction in charging ability of the toner, whether it is in a negative or positive charging developer. Thus, Table I of U.S. Pat. No. 5,278,016 shows a reduction in negative toner charging of 20 to 30 microcoulombs per gram in two toners, while Tattle II generally shows a reduction of positive charging from about 5 to about 20 microcoulombs per gram of toner, for the toner examples described therein, while only in one toner shown in Table II is there an example of a small increase of about 4 microcoulombs per gram of toner in positive charging.

Illustrated in U.S. Ser. No. 308,223, filed concurrently herewith, she disclosure of which is totally incorporated herein by reference, is a carrier comprised of a carrier core, optional polymer, and fluorosilanated pigment coating.

While toner pigments are known, there is a need for new pigments with many of the advantages illustrated herein. More specifically, there is a need for novel halosilanated, especially fluorosilanated pigments, which can be selected as toner pigments and as a component of carrier coatings, and wherein the resulting compositions permit excellent xerographic characteristics, including high negative charge, triboelectric stability, relative humidity insensitivity, and the like. There is also a need for economical and direct processes for the preparation of fluorosilanated pigments, especially fluorosilanated carbons. These and other needs are achievable with embodiments of the present invention.

SUMMARY OF THE INVENTION

It is an object of the present invention to provide halosilanated pigments with many of the advantages illustrated herein.

In another object of the present invention there are provided fluorosilanated pigments.

Further, in another object of the present invention there are provided fluorinated carbons with a high negative charge.

Also, in yet another object of the present invention there are provided fluorosilanated passivated pigments, thus for example the pigment charge has minimal, if any, adverse effect on the compositions within which they are present.

Another object of the present invention resides in providing processes for the preparation of passivated pigments, and wherein the pigment contains a surface that is fluorosilanated.

Also, in another object of the present invention there are provided carrier particles comprised of coating containing passivated fluorosilanated pigments.

Further, in another object of the present invention there are provided positively, or negatively charged toner compositions containing fluorinated silanated or fluorosilane polymer treatment pigments, and developers thereof.

In yet a further object of the present invention there can be provided, it is believed, humidity insensitive, from about, for example, 20 to 80 percent relative humidity at temperatures of from 60° to 80° F. as determined in a relative humidity testing chamber, positively charged toner compositions with desirable admix properties of 5 seconds to 60 seconds as determined by the charge spectrograph, and preferably less than 15 seconds, for example, and more preferably from about 1 to about 14 seconds, and acceptable triboelectric charging characteristics of from about 10 to about 40 microcoulombs per gram.

Additionally, in a further object of the present invention there are provided magnetic toner compositions.

Another object of the present invention resides in the formation of toners and carriers which will enable the development of images in electrophotographic imaging apparatuses, which images have substantially no background deposits thereon, are substantially smudge proof or smudge resistant, and therefore are of excellent resolution; and further, such toner compositions can be selected for high speed electrophotographic apparatuses, that is those exceeding 70 copies per minute.

These and other objects of the present invention can be accomplished in embodiments thereof by providing halogenated, and preferably fluorosilanated pigments. More specifically, the present invention in embodiments is directed to fluorosilanated passivated carbon pigments and processes thereof.

The fluorosilanated pigments of the present invention are comprised of the pigment particle, and a fluorosilanated surface layer comprised of at least fluorine and silicon, where the ratio of fluorine to silicon atoms is at least in the ratio of 1 part of fluorine to 1 part of silicon, up to about 40 parts of fluorine to 1 part of silicon. The fluorosilanating agent typically is of the formula R—SiXX'X", where R is a group containing fluorine, X and X' are a halogen or an alkoxy group, and X" may be halogen, and alkoxy, alkyl, or fluoroalkyl group. In the process of the present invention, the fluorosilane is capable of reaction with itself to form an integral surface layer of fluorosilane. If all X, X', and X" are alkoxy or halide, then a three dimensional crosslinked structure will be formed on the surface of the particle, while if only X and X' are alkoxy or halide then a two-dimensional polymer will be formed on the surface. To ensure the surface integrity of the layer it is preferable that all of X, X', and X" be alkoxy groups of a carbon chain length of from 1 to about 6 as, for example, methoxy, ethoxy, propoxy, butoxy groups, or halide groups of, for example, chloride, bromide, iodide, or fluoride. While it is not desired to be limited by theory, it is believed that the alkoxy or halogen groups hydrolyze in the presence of water to form hydroxyl groups. These hydroxyl groups condense together to provide a crosslinked polymeric structure of R—Si groups held together by Si—O—Si bonds. No surface reaction of fluorosilane with the pigment particle, therefore, results, and the pigment particle characteristics are thus not changed by the fluorosilanation. Alkyl and alkoxy includes carbon chain lengths of from 1 to about 25 carbon atoms, and preferably from 1 to about 6 carbon atoms. Alkyl includes methyl, ethyl, propyl, butyl, pentyl, hexyl, and the like.

In the prior art, the surface of the particle itself usually contains, it is believed, a component that is capable of reacting with a halogen, or halogen containing compound by halogenation or fluorination. Thus, in the fluorination of carbon blacks, reference U.S., Pat. No. 4,524,119, the unsaturated carbon of the carbon black reacts with the fluorine to provide a $CF_x$, or $(C_2F)_n$ structure wherein the fluorine is chemically bonded to the carbon. Similarly, with the halogenated resins of U.S. Pat. No. 5,278,016, the halogen is thought to react with the unsaturated carbon in the resin to yield a CX bond, where X is the halogen atom utilized.

The pigments that result from the treatment process of the present invention have higher negative charging than the comparable untreated pigments, such as about −0.1 to about −1.0 volt more negative contact potential for the pigment, but substantially no change in the conductivity or color of the pigment particle. When these treated pigments are used as carrier coatings or in toners, the negative charging of the carrier or toner is increased by 5 to 30 microcoulombs per gram of toner particles compared to the carrier or toner with untreated pigment. Infrared spectroscopy evidences that no observable chemical change occurs in the structure of the pigment after fluorosilanation. Infrared spectroscopy also evidences that the structure of the fluorosilane layer is consistent with a self-condensation reaction resulting in a layer of Si—R groups linked by Si—O—Si bonds, where R is the fluorine containing alkyl chain.

Examples of pigments that may be selected in various effective amounts, such as from about 1 to about 99 percent by weight, and preferably from 1 to about 20 weight percent, include carbon blacks like Columbian Chemical Corporation REGAL 660®, CSX 99, CSX 102, Printex A, Lampblack 101, REGAL 330®, RAVEN 5750™, RAVEN 7000™, RAVEN 410™, CONDUCTEX SC ULTRA™, Black Pearls 1300, Black Pearls 2000, Cabot Corporation Monarch 700, VULCAN XC-72R™, Sterling, and Allied-Signal ACCUFLUOR 2010™, 2028™, and 2065™; FANAL PINK™, HOSTAPERM PINK™, PV FAST BLUE™, Yellow FGL, Paliotol Yellow, and magnetites or iron oxides, such as MAPICO BLACK™, and the like. Also, there can be selected for the fluorosilane treatment charge control agents such as cetyl pyridinium chloride, Orient Chemical BONTRON E-88™ and BONTRON E-84™, Hodogaya Chemical Company TRH, and dimethyl distearyl ammonium bisulfate.

In embodiments, the fluorinated pigments illustrated herein can be prepared by solution phase processes, or gas phase methods. In the solution process, the pigment like carbon black is dispersed in a suitable solvent; thereafter, there is added a fluorosilane followed by mixing; and subsequently optionally filtering and washing.

More specifically, in the solution phase process, 100 parts of pigment are mixed with 200 to 2,000 parts solvent, and 1 to 100 parts, and more preferably 5 to 40 parts, of the selected fluorosilane, and mixed at 50 to 500 rpm at a temperature of 10° to 100° C., and more preferably 15° to 50° C. for a period of 0.25 to 5 hours, and more preferably 0.5 to 2 hours. The resulting slurry is then filtered by any suitable methods such as vacuum filtration. The resulting pigment filter cake is then washed from about 1 to 10 times with from about 50 to about 1,000 parts solvent like methylene chloride, and dried using, for example, a vacuum oven, convection oven or fluidized bed dryer.

Examples of solvents include suitable organic and aliphatic solvents sufficient to disperse the pigment, such as for example from about 2 about 20 parts solvent, and more preferably from about 5 to about 10 parts solvent, per one part of the pigment. Examples of solvents include toluene, benzene, alcohols like methanol, ethanol, n-propyl alcohol, isopropyl alcohol, butanol, methyl ethyl ketone, ethyl acetate, methylene chloride, pentane, hexane, heptane, and cyclohexane.

Fluorosilane reactants include trifluoropropyl trichlorosilane, trifluoropropyl triethoxysilane, tridecafluoro-1,1,2,2,-tetrahydrooctyl-1-trichlorosilane, tridecafluoro-1,1,2,2,-tetrahydrooctyl-1-triethoxysilane, tridecafluoro-1,1,2,2-tetrahydrooctyl-1-methyl-1-dichlorosilane, and heptadecafluoro-1,1,2,2-tetrahydrodecyl-1-trimethoxysilane. The fluorosilanating agent may have the structure R—SiXX'X", where R is a group containing fluorine, X and X' are halogen or alkoxy, and X" may be either a halogen and alkoxy, or an alkyl or haloalkyl group.

In the gas phase process, the pigment like carbon black is added to a suitable reactor like a stainless steel stirred tank reactor, tubular reactor, packed column reactor or tower reactor and there is added thereto a fluorosilane vapor under vacuum; or alternatively the fluorosilane vapor can be added with a carrier gas like dry air, nitrogen, and the like, followed by drying under vacuum. More specifically, in the gas phase process, 100 parts of pigment are loaded into a reactor vessel. The fluorosilane, 1 to 100 parts, is loaded into a separate vessel. If a carrier gas is to be used, the outlet of the fluorosilane vessel is connected to the inlet of the reactor. The inlet of the fluorosilane vessel is connected to an air source and air is passed through the fluorosilane until all of the fluorosilane is volatilized and carried through the reactor containing the pigment. The relative humidity of the air stream should be controlled in the range of from 0 to 50 percent RH, and preferably from 1 to 25 percent RH. This step consumes from 0.25 to 5 hours. If a vacuum process is to be used, the outlet of the fluorosilane vessel is connected to the inlet of the reactor. Both vessels are connected to a vacuum source creating a vacuum of $10^{-3}$ to $10^{+1}$ Torr in the two vessels, thereby causing the fluorosilane to be volatilized and carried into the reactor containing the pigment. This consumes from 0.25 to 10 hours. For the aforementioned both gas phase processes, it is preferable, although not essential, to have mixing in the reactor during the silanization, where the mixing is provided by, for example, a mechanical agitator or grinding media, reference tank reactors, or by the turbulent flow of the carrier gas in column or tower type reactors. Temperatures should be in the range of 10° to 100° C., and more preferably 15° to 50° C.

Illustrative examples of suitable toner resins that can be selected for the toner compositions include polyamides, polyolefins, styrene acrylates, styrene methacrylates, styrene butadienes, crosslinked styrene polymers, epoxies, polyurethanes, vinyl resins, including homopolymers or copolymers of two or more vinyl monomers; and polyesters, such as the polymeric esterification products of a dicarboxylic acid and a diol comprising a diphenol. Vinyl monomers include styrene, p-chlorostyrene, unsaturated mono-olefins such as ethylene, propylene, butylene, isobutylene and the like;saturated mono-olefins such as vinyl acetate, vinyl propionate, and vinyl butyrate; vinyl esters like esters of monocarboxylic acids including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; mixtures thereof; and the like. Specific examples of resins that can be selected include styrene butadiene copolymers with a styrene content of from about 70 to about 95 weight percent. In addition, crosslinked resins, including polymers, copolymers, or homopolymers of the aforementioned styrene polymers, may be selected.

As one toner resin, there are selected the esterification products of a dicarboxylic acid and a diol comprising a diphenol. These resins are illustrated in U.S. Pat. 3,590,000, the disclosure of which is totally incorporated herein by reference. Other specific toner resins include styrene/methacrylate copolymers, and styrene/butadiene copolymers; PLIOLITES®; suspension polymerized styrene butadienes, reference U.S. Pat. No. 4,558,108, the disclosure of which is totally incorporated herein by reference; polyester resins obtained from the reaction of bisphenol A and propylene oxide, followed by the reaction of the resulting product with fumaric acid, and branched polyester resins resulting from the reaction of dimethylterephthalate, 1,3-butanediol, 1,2-propanediol, and pentaerythritol, styrene acrylates, and mixtures thereof. Also, waxes with a molecular weight of from about 1,000 to about 20,000, such as polyethylene, polypropylene, and paraffin waxes, can be included in, or on the toner compositions as fuser roll release agents.

The resin particles are present in a sufficient, but effective amount, for example from about 70 to about 90 weight percent. Thus, when 1 percent by weight of a charge enhancing additive is present, and 8 percent by weight of the fluorosilane pigment is present, about 91 weight percent of resin is selected.

There can also be blended with the toner compositions of the present invention external additive particles including flow additives, which additives are usually present on the surface thereof. Examples of these additives include colloidal silicas such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with charge additives in an amount of from about 1 to about 30 weight percent, and preferably 10 weight percent, followed by the addition thereof to the toner in an amount of from 0.1 to 10, and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15™ commercially available from Eastman Chemical Products, Inc., VISCOL 550-P™, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions of the present invention are believed to have a molecular weight of from about 4,000 to about 5,000. Many of the polyethylene and polypropylene compositions useful in the present invention are illustrated in British Patent 1,442,835, the disclosure of which is totally incorporated herein by reference.

The low molecular weight wax materials are present in the toner composition of the present invention in various amounts, however, generally these waxes are present in the toner composition in an amount of from about 1 percent by weight to about 15 percent by weight, and preferably in an amount of from about 2 percent by weight to about 10 percent by weight.

Encompassed within the scope of the present invention are colored toner and developer compositions comprised of toner resin particles, optional carrier particles, known charge enhancing additives and fluorinated passivated pigments or colorants red, blue, green, brown, magenta, cyan and/or yellow particles, as well as mixtures thereof. More specifically, with regard to the generation of color images utilizing a developer composition with the treated pigments of the present invention, illustrative examples of magenta materials that may be selected as pigments which are subsequently fluorinated as illustrated herein include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like including copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In embodiments, these fluorinated colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles can be selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate and a silane, such as triethoxy silane, reference U.S. Pat. Nos. 3,526,533 and 3,467,634, the disclosures of which are totally incorporated herein by reference; polymethyl methacrylates; other known coatings; and the like. The carrier particles may also include in the coating, which coating can be present in one embodiment in an amount of from about 0.1 to about 3 weight percent, conductive substances, such as carbon black, in an amount of from about 5 to about 30 percent by weight. Polymer coatings not in close proximity in the triboelectric series can also be selected, reference U.S. Pat. Nos. 4,935,326 and 4,937,166, the disclosures of which are totally incorporated herein by reference, including, for example, KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and preferably from about 100 to about 200 microns in average volume diameter microns thereby permitting them to possess sufficient density and inertia to avoid adherence to the electrostatic images during the development process. The carrier component can be mixed with the toner composition in various suitable combinations, such as from about 1 to 5 parts per toner to about 100 parts to about 200 parts by weight of carrier.

In embodiments, the carrier particles selected can include in the polymer coating the fluorinated pigments of the present invention. More specifically, the coatings contain from about 2 to about 30 percent, and more preferably from about 5 to about 20 percent of fluorosilanated carbon black in a polymer resin or mixture of two or more polymer resins.

Examples of carrier coatings containing from about 2 to about 30 weight percent and, more preferably, from about 5 to about 20 weight percent of fluorosilanated carbon black in a polymer resin or resins, are derived from monomers or comonomers such as vinyl monomers comprised of styrene and its derivatives, such as styrene, α-methylstyrene, p-chlorostyrene and the like; monocarboxylic acids and their derivatives, such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids having a double bond and their derivatives, such as maleic acid, monobutyl maleate, dibutylmaleate; vinyl esters such as vinyl chloride, vinyl acetate and vinyl benzoate; vinyl ketones such as vinyl methyl ketone and vinyl ether ketone; vinyl ethyl ether and vinyl isobutyl ether; vinyl naphthalene; unsaturated mono-olefins such as isobutylene and the like; vinylidene halides such as vinylidene chloride and the like; N-vinyl compounds such as N-vinyl pyrrole and fluorinated monomers such as pentafluoro styrene, alyl pentafluorobenzene and the like; and mixtures thereof. The carrier can be coated by known processes of solution coating or dry powder coating. For preparation of dry powder coatings, submicron conductive powders incorporating fluorosilanated carbon black or other pigments can be prepared, for example, by the process described in U.S. Pat. No. 5,236,629, the disclosure of which is totally incorporated herein by reference. Carriers coated with polymer containing the fluorosilanated carbon black exhibit negative tribo charging, for example from 10 to 50 microcoulombs per gram more negative than a coated carrier prepared with the untreated carbon black, and with the same carrier conductivity as the coated carrier prepared with the untreated carbon black.

In developers with the fluorosilanated pigments of the present invention incorporated in the toner, the toner can be more negatively charged by 5 to 30 microcoulombs per gram of toner particles than the compositions with the same pigment that is not fluorosilanated, in developers that render the charge of the toner negative. In developers that render the charge of the toner positive, the toners and developers with the fluorosilanated pigments result in toner charging that is less positive by 5 to 30 microcoulombs per gram of toner particles, than the compositions with the same pigment that is not fluorosilanated. In embodiments, varying the amount of the fluorosilanated treatment of different color pigments, whereby the charge level of the fluorosilanated pigment becomes increasingly more negative as the amount of fluorosilane on the pigment increases, and as the length of the fluorosilane chain increases, can result in toners with different color pigments that charge with the same sign of charge, and to about the same extent of charge in a developer where without the differing fluorosilane treatment each of the toners with the different pigments charge differently, by up to about 60 microcoulombs per gram of toner particles, as is well known in the art, and may be of different sign of charge in the developer. Thus, developers with toners with different color pigments can be passivated in charge, such that the charge of the toners is substantially the same, without the use of surface additives. The developers of this invention in embodiments require less amounts, from about 0.5 to about 5 percent of charge control agent without the fluorosilanated pigments, to about 0.05 to 0.5 percent of charge control agent with the fluorosilanated pigments. The above reduction in charge control agents, and like additives results in a less costly toner. Also, the reduced amount of charge control agents, which agents are often reactive, thereby changing the properties of the toner resin, provide poor fusing performance, and react with the materials of the fuser roll, is substantially reduced by selecting the fluorosilanation pigments illustrated herein. In addition, the fluorosilanation process provides a very inert surface to the pigment, reducing any possible reaction of the pigment with the toner resin.

The toner compositions are usually jetted and classified subsequent to preparation to enable toner particles with a preferred average diameter of from about 5 to about 25 microns, and more preferably from about 8 to about 12 microns. Also, the toner compositions of the present invention preferably possess a triboelectric charge of from about 0.1 to about 2 femtocoulombs per micron in embodiments thereof as determined by the known charge spectograph. Admix time for the toners of the present invention are preferably from about 5 seconds to 1 minute, and more specifically from about 5 to about 15 seconds in embodiments thereof as determined by the known charge spectograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

With further respect to the present invention, one developer composition is comprised of a toner composition containing distearyl methyl hydrogen bisulfate, dimethyl distearyl ammonium sulfonate as a charge enhancing additive; fluorinated pigment particles, resin particles, and carrier particles comprised of a core containing thereover a plurality and preferably two polymeric coatings, namely a first polymeric coating of, for example, KYNAR®, 60 weight percent, and a second polymeric coating of, for example, polymethacrylate, 40 weight percent, at a total coating weight of 1.25 weight percent, which coatings are not in close proximity in the triboelectric series, reference U.S. Pat. Nos. 4,935,326 and 4,937,166, the disclosures of each of these patents being totally incorporated herein by reference, and which coating in embodiments contains a fluorosilane treated pigment like fluorosilane carbon black.

Examples of charge additives include alkyl pyridinium halides, organic sulfates, organic sulfonates, organic bisulfates, distearyl dimethyl ammonium methyl sulfate, and the like present in various amounts such as from about 0.05 to about 10 and preferably about 3 weight percent.

The following Examples are being supplied to further define various species of the present invention, it being noted that these Examples are intended to illustrate and not limit the scope of the present invention. Parts and percentages are by weight unless otherwise indicated.

Pigment Evaluation:

There was generated infrared spectra of pressed disks of about 0.07 weight percent of the carbon black with the fluorosilane coating dispersed in potassium bromide powder. The presence of the fluorosilane was evidenced by the appearance of C—F bands in the 1,500 to 1,000 cm-1 region of the spectra, and the integrated intensity of these bands was used to quantify the relative amount of adsorbed fluorosilane. The evidence of a crosslinked fluorosilane is arrived at by the absence of Si—Cl bonds, and from the appearance of a broad band near 1,100 cm$^{-1}$ due to Si—O—Si linkages. Specific to carbon blacks, there was no change in the bands due to surface functionalities which suggests there are no direct bonds formed between the fluorosilane and the carbon black, and the fluorosilane treatment did not modify the surface, and did not penetrate into the bulk of the carbon black because of the size of the fluorosilane and because of the absence of any carbon black surface reactivity.

Carbon Black Evaluation:

Carbon black charging was evaluated by the standard contact potential techniques using a Trek Model 320B DC electrostatic voltmeter with a Trek 3250 noncontact probe at 40 percent RH. A sample of the carbon black was placed in a ⅛ inch deep ½ inch diameter well in a grounded stainless steel plate. About 100 to 200 milligrams of the carbon black sample were leveled with a straight-edge with the top surface of the plate. The surface of the sample of carbon black was held 1 millimeter from the probe surface. The voltage measured on the voltmeter was recorded. The voltage relative to a sample of REGAL 330® carbon black was then calculated to provide a relative contact potential in volts. The measured contact potential is a measure of the relative charging ability of the carbon black.

The resistivity of the fluorosilane treated and untreated carbon blacks were measured by pressing 0.1 gram sample of carbon black in an insulating TEFLON® lined stainless steel cylindrical cell with an interior diameter of 0.91 centimeter. The sample was pressed to 2,500 pounds per square inch pressure. The thickness of the pressed disk of carbon black was measured using a micrometer. The resistance of the sample in ohms was measured using a Gen Rad 1689 Precision RLC Digibridge. The resistivity of the carbon blacks was calculated by the standard method from the measured resistance. The conductivity of the carbon black is the inverse of the calculated resistivity, and is calculated as 1/(resistivity). For use as carrier coatings, it is desirable that the conductivity of the carbon black be high, above about 0.1, and preferably above about 1 ohm$^{-1}$ centimeter$^{-1}$ and, therefore, that the resistivity be as low as possible, less than about 10, and preferably about 1 ohm centimeter in many applications. It is particularly desirable to be able to change the charging properties of the carbon black without changing the conductivity. Resistivity of the Allied-Signal Accufluor 2010 was also measured in this manner. Resistivity of the Allied-Signal Accufluor 2028 and 2065 are from the Allied-Signal Accufluor Application Bulletin. All resistivity values are tabulated in Table B.

The carbon blacks were also evaluated by Infrared Spectroscopy which indicate the presence of the fluorosilane on the surface of the fluorosilane treated carbon blacks.

Carrier Charging Evaluation:

The toner triboelectric charge-to-mass ratio, Q/M, was measured by the standard tribo blow-off method after the toner and carrier had been equilibrated at 20 percent relative humidity. The developer composition of 0.5 gram of toner, and 25 grams of carrier was mixed for 15 minutes. The carrier was comprised of 100 micron iron core, obtained from Nuclear Metals, Inc., particles coated with either 0.7 percent by weight of a coating, the coating being comprised of 82 percent by weight of either polystyrene or polymethyl methacrylate, and 18 percent by weight of the fluorosilanated treated carbon black. A single reference toner was used for all of the charge measurements. This toner was comprised of a styrene/butadiene copolymer, 95 weight percent, containing 5 percent by weight of quinacridone pigment. The charging of the carrier is equal in magnitude and opposite in sign to the charge on the toner, which charge is measured in microcoulombs per gram of toner.

TREATED CB EXAMPLES

EXAMPLE A

CONDUCTEX SC ULTRA™ carbon black obtained from Columbian Chemical Company was treated using the gas phase fluorosilanation process according to the following procedure. 50 Grams of CONDUCTEX SC ULTRA™ carbon black was loaded in a vertical tubular reactor. Trifluoropropyltrichlorosilane (5.0 grams) was loaded into a separate vessel. The outlet of the trifluoropropyltrichlorosilane vessel was connected to the inlet of the tubular reactor. The inlet of the trifluoropropyltrichlorosilane vessel was connected to a dry air source (relative humidity less than 2 percent). Dry air was passed through the trifluoropropyltrichlorosilane at a rate of 500 sccm until all the trifluoropropyltrichlorosilane was volatilized and carried through the tubular reactor containing the carbon black. This required approximately 50 minutes. After the trifluoropropyltrichlorosilane was completely volatilized, the air flow was continued for a further fifteen minutes to remove residual trifluoropropyltrichlorosilane. Contact potential of the resulting treated carbon black comprised of 90 percent of CONDUCTEX SC ULTRA™ carbon black and 10 percent of crosslinked fluorosilane coating (at 40 percent RH) was measured at −0.27 volt. The contact potential was more negative than the contact potential of −0.01 volt for the same carbon black before treatment, as shown in Table A. The more negative contact potential was indicative of a more negative charging property.

EXAMPLE B

The procedure of Example A was repeated except that 10.0 grams of trifluoropropyltrichlorosilane were used. The contact potential of the carbon black (at 40 percent RH) was measured at −0.89 volt. The contact potential was more negative than the contact potential of −0.01 volt for the same carbon black before treatment, as shown in Table A. The contact potential of this sample with 20 percent by weight of the fluorosilane was also more negative than the contact potential of −0.27 volt for the same carbon black with less fluorosilane treatment of 10 percent by weight from Example A, as shown in Table A. The contact potential was also more negative than the contact potential of other commercially available carbon blacks without fluorosilane or fluorine treatment, as shown in Table A.

EXAMPLE C

The procedure of Example A was repeated except that 25.0 grams of trifluoropropyltrichlorosilane were used. The contact potential of the carbon black (at 40 percent RH) was measured at −0.81 volt, and can be compared to other carbon blacks in Table A. The conductivity of the fluorosilane treated carbon black was 1.1 ohm-centimeters, the same as the untreated carbon black as shown in Table B, while the contact potential of the treated carbon black was 0.8 volt, more negative than the same untreated carbon black, as shown in Table A. The treated carbon black of this Example was compared to the treated carbon black obtained by fluorine treatment, such as by Allied-Signal, in Table B. While the fluorosilane treatment of this Example imparts more negative charge to the carbon black, the treatment does not change the conductivity of the carbon black. The fluorine treatment of the Allied-Signal ACCUFLUOR™ carbon black does render the charge of the carbon black more negative, however, the conductivity of the carbon black decreases to a large extent, as shown in Table B, from a resistivity of less than 10 ohm-centimeters to greater than $10^{11}$ ohm-centimeters as the extent of the treatment is increased.

EXAMPLE D

A ceramic boat containing 200 milligrams of RAVEN 5750™ carbon black was placed in a vessel connected to a vacuum pump until a vacuum of about 0.06 Torr was obtained. A vessel containing trifluoropropyltrichlorosilane was then connected to the first vessel containing the carbon 13lack, thereby causing the fluorosilane to be volatilized. 1.2 Torr of the silane was added in this manner. The carbon black and silane remained for about 5 minutes; the excess was pumped off; a further 1.2 grams of the silane was volatilized into the vessel containing the carbon black, left for 7 minutes; then the excess was pumped off again. The entire process was accomplished at room temperature, about 25° C.

The contact potential of the treated carbon black (at 40 percent RH) was measured as −0.92 volt. This contact potential was more negative than the contact potential of −0.31 volt for the same carbon black before treatment, as shown in Table A.

EXAMPLE E

The procedure of Example D was followed, except that Allied ACCUFLUOR 2010™ carbon black with 11 weight percent fluorine treatment was used instead of RAVEN 5750™ The contact potential of the carbon black (at 40 percent RH) was measured at −1.50 volts. This contact potential was more negative than the contact potential of −1.41 volts for the same carbon black before fluorosilane treatment, and was also more negative than the carbon blacks measured, as shown in Table A.

EXAMPLE F

100 Grams of CONDUCTEX SC ULTRA™ carbon black were dispersed with stirring in 1 liter of toluene at 25° C. To this were added 15 grams of trifluoropropyltrichlorosilane. The mixture was stirred at 300 rpm at 25° C. for 45 minutes. The entire mixture was then filtered using a laboratory vacuum filtration apparatus. The carbon black filter cake was washed with three 0.1 liter volumes of toluene and dried in a convection oven at room temperature.

EXAMPLE G

100 Grams of CONDUCTEX SC ULTRA™ carbon black was dispersed with stirring in 1 liter of toluene at 25° C. To this was added 2.0 grams of (tridecafluoro-1,1,2,2-tetrahydrooctyl)-1-trichlorosilane. The mixture was stirred at 300 rpm at 25° C. for 45 minutes. The entire mixture was then filtered using a laboratory vacuum filtration apparatus. The carbon black filter cake was washed with three 0.1 liter volumes of toluene and dried in a convection oven at room temperature.

(COATED CARRIER EXAMPLE)

COMPARATIVE EXAMPLE H

Coated carrier was prepared by mixing a solution of 82 parts of polymethylmethacrylate, 18 parts of CONDUCTEX SCULTRA™ carbon black, and 700 parts of methyl ethyl ketone with 1,430 parts of 100 micron diameter Nuclear Metals, Inc. carrier core. Following mixing, the methyl ethyl ketone was allowed to evaporate. The coated carrier was then vacuum dried for 15 hours at 25° C. The toner triboelectric charge-to-mass ratio, Q/M, was measured using the standard tribo blow-off method, after the toner and carrier had been equilibrated in a 20 percent relative humidity chamber. The developer composition comprised of 0.5 gram of toner, and 25 grams of coated carrier were mixed for 15 minutes. This toner was comprised of a styrene/butadiene copolymer containing 5 percent by weight of quinacridone pigment. The charging of the carrier was equal in magnitude and opposite in sign to the charge on the toner, whose charge was measured in microcoulombs per gram of toner. The carrier charge was 36 microcoulombs per gram of toner, and is tabulated in Table C

EXAMPLE I

A coated carrier was produced as described in Example H with the treated CONDUCTEX SC ULTRA™ Carbon black of Example A replacing the untreated CONDUCTEX SC ULTRA™ The carrier charge was 24 microcoulombs per gram of toner, 12 microcoulombs per gram of toner more negative than that of the comparative Example H. This Example is tabulated in Table C.

EXAMPLE J

A coated carrier was generated as described in Example H with the treated CONDUCTEX SC ULTRA™ carbon black of Example B. The carrier charge was 10 microcoulombs per gram of toner, 26 microcoulombs per gram of toner more negative than that of the comparative Example H, and 14 microcoulombs per gram of toner more negative than that of the Example I, which had a lower 10 weight percent of fluorosilane treatment of the carbon black. This Example is tabulated in Table C.

COMPARATIVE EXAMPLE K

A coated carrier was prepared as described in Example H with CONDUCTEX SC ULTRA™ carbon black and using polystyrene in the place of polymethyl methacrylate. The carrier charge was 4.5 microcoulombs per gram of toner. This Example is tabulated in Table C.

EXAMPLE L

A coated carrier was produced as described in Example H with the treated CONDUCTEX SC ULTRA™ carbon black of Example A and using polystyrene in the place of polymethyl methacrylate. The carrier charge was −10 microcoulombs per gram of toner, 14.5 microcoulombs per gram of toner more negative than that of the comparative Example K. This Example is tabulated in Table C.

EXAMPLE M

A coated carrier was produced as described in Example H with the treated CONDUCTEX SC ULTRA™ carbon black of Example F. The carrier charge was 15 microcoulombs per gram of toner, 21 microcoulombs per gram of toner more negative than that of the comparative Example H. This Example is tabulated in Table D, which shows the charging of carriers incorporating carbon blacks that were treated using a solution phase fluorosilane treatment.

EXAMPLE N

A coated carrier was produced as described in Example H with the treated CONDUCTEX SC ULTRA™ carbon black of Example G. The carrier charge was −7.9 microcoulombs per gram of toner, 12.4 microcoulombs per gram of toner more negative than that of the comparative Example K. This Example is tabulated in Table D.

TABLE A

Characterization of Gas Phase Treated Fluorosilanated Carbon Blacks

| EXAMPLE | CARBON BLACK | WT % ADDED FLUOROSILANE | RELATIVE AMOUNT OF FLUORINE | CONTACT POTENTIAL (VOLTS) 40% RH |
|---|---|---|---|---|
| | Regal 330 | None | 0 | 0 |
| | CSX-99 | None | 0 | −0.11 |
| | BP1300 | None | 0 | −0.41 |
| | Conductex SC Ultra | None | 0 | −0.01 |
| Example A | Conductex SC Ultra | 10 | 1.5 | −0.27 |
| Example B | Conductex SC Ultra | 20 | 5.5 | −0.89 |
| Example C | Conductex SC Ultra | 50 | 3.1 | −0.81 |
| | Raven 5750 | None | 0 | −0.31 |
| Example D | Raven 5750 | Saturated | Not Measured | −0.92 |
| | Allied Accufluor 2010 Fluorinated Carbon Black | None | Not Measured | −1.41 |
| Example E | Allied Accufluor 2010 Fluorinated Carbon Black | Saturated | Not Measured | −1.50 |

TABLE B

Characterization of Resistivity of Gas Phase Treated Fluorosilane Carbon Blacks

| EXAMPLE | CARBON BLACK | WT % ADDED FLUORO-SILANE | WT % ALLIED-SIGNAL FLUORINE TREAT-MENT | MEASURED RESISTIVITY (OHM-CM) | RESISTIVITY FROM ALLIED-SIGNAL APPLICA-TION BULLETIN (OHM-CM) |
|---|---|---|---|---|---|
| | Conductex SC Ultra | None | None | 1.1 | — |
| Example C | Conductex SC Ultra | 50 | None | 1.1 | — |
| | Allied-Signal Accufluor 2010 Fluorinated Carbon Black | None | 11 | 2.3 | <10 |
| | Allied-Signal Accufluor 2028 Fluorinated Carbon Black | None | 28 | Not Measured | $10^8$ |
| | Allied-Signal Accufluor 2065 Fluorinated Carbon Black | None | 65 | Not Measured | $10^{11}$ |

TABLE C

Triboelectric Charging of Carrier Coatings Containing Gas Phase Treated Fluorosilane Carbon Blacks

| CARRIER | CARRIER COATING | CARBON BLACK | WT % OF ADDED FLUORO-SILANE | CARRIER CHARGE AT 20% RH IN MICRO-COULOMBS PER GRAM |
|---|---|---|---|---|
| Comparative Example H | Polymethyl methacrylate | SC Ultra | 0 | 36 |
| Example I | Polymethyl methacrylate | Treated SC Ultra Example A | 10 | 24 |
| Example J | Polymethyl methacrylate | Treated SC Ultra Example B | 20 | 10 |
| Comparative Example K | Polystyrene | SC Ultra | 0 | 4.5 |
| Example L | Polystyrene | Treated SC Ultra Example A | 10 | −10 |

60

TABLE D

Triboelectric Charging of Carrier Coatings Containing Solution Phase Treated Fluorosilane Carbon Blacks

| CARRIER | CARRIER COATING | CARBON BLACK | WEIGHT PERCENT OF FLUORO-SILANE ADDED ON CARBON BLACK | CARRIER CHARGE AT 20% RH IN MICRO-COULOMBS PER GRAM |
|---|---|---|---|---|
| Comparative Example H | Polymethyl methacrylate | SC Ultra | 0% | 36 |
| Example M | Polymethyl methacrylate | Treated SC Ultra Example F | 15% $CF_3(CH_2)_2$—$SiCl_3$ | 15 |
| Comparative Example K | Polystyrene | SC Ultra | 0% | 4.5 |
| Example N | Polystyrene | Treated SC Ultra | 2% $CF_3(CF_2)_5$—$(CH_2)_2SiCl_3$ | −7.9 |

Charging Evaluation:

The toner triboelectric charge-to-mass ratio, Q/M, was measured using the standard tribo blow-off method, after the toner and carrier had been equilibrated at either 20 percent relative humidity or at 80 percent relative humidity. The developer composition, comprised of the toner and a carrier, was mixed for 15 minutes on a roll mill. The carrier was comprised of 100 micron ferrite particles coated with a terpolymer of 81 percent by weight of methyl methacrylate, 14 percent by weight of styrene, and 5 percent by weight of vinyl triethoxysilane. The charge on the toner was measured in microcoulombs per gram of toner.

COMPARATIVE EXAMPLE O

The charge of 10 micron diameter toner of 96 percent by weight of SPAR™ polyester, a propoxylated bisphenol A fumarate, and 4 percent by weight of PV FAST BLUE™ pigment was measured at −34 microcoulombs per gram at 20 percent RH, and −16 microcoulombs per gram at 80 percent RH. The ratio of the charge at 20 percent RH to that at 80 percent RH is 2.1, which is the relative humidity sensitivity. The Example is tabulated in Table E.

EXAMPLE P 100 grams of the toner of Example O were loaded in a vertical tubular reactor. Trifluoropropyltrichlorosilane (15.0 grams) was loaded into a separate vessel. The outlet of the trifluoropropyltrichlorosilane vessel was connected to the inlet of the tubular reactor. The inlet of the trifluoropropyltrichlorosilane vessel was connected to a dry air source (relative humidity less than 2 percent). Dry air was passed through the trifluoropropyltrichlorosilane at a rate of 600 sccm/minute until all the trifluoropropyltrichlorosilane was volatilized and carried through the tubular reactor containing the toner. This required approximately 40 minutes. After the trifluoropropyltrichlorosilane was completely volatilized, the air flow was continued for a further fifteen minutes to remove residual trifluoro, propyltrichlorosilane. The charge of these toner particles was measured at −65 microcoulombs per gram at 20 percent RH, and −42 microcoulombs per gram at 80 percent RH. The charging evaluation is tabulated in Table E. The charge at 20 percent RH and at 80 percent RH were each more negative than the charging of the toner without the fluorosilane treatment, and the ratio of the charge at 20 percent RH to that at 80 percent RH was 1.5, lower than that without the fluorosilane treatment. The Examples are compared in Table E.

COMPARATIVE EXAMPLE Q

To 5 grams of 10 micron diameter toner of 96 percent by weight of polyester and 4 percent by weight of PV FAST BLUE™ pigment were added 25 milligrams of the BONTRON E-88™, available from Hodogaya Chemicals of Japan, charge control agent. The mixture was blended together with 50 grams of ⅛ inch diameter steel shot on a roll mill. The steel shot were removed, and 1 gram of the blended toner was then mixed with 24 grams of carrier. The triboelectric charge of the blended toner particles was −23 microcoulombs per gram at 20 percent RH, and −9 microcoulombs per gram at 80 percent RH. The ratio of the charge at 20 percent RH to that at 80 percent RH was 2.4. The Example is tabulated in Table F.

EXAMPLE R

The procedure of Comparative Example Q was followed, except that the fluorosilane treated BONTRON E-88™ charge control agent was used instead of the untreated BONTRON E-88™. The mixture was blended together with 50 grams of ⅛ inch diameter steel shot on a roll mill. The steel shot were removed, and 1 gram of the blended toner was then mixed with 24 grams of carrier. The triboelectric charge of these blended toner particles was −30 microcoulombs per gram at 20 percent RH, and −13 microcoulombs per gram at 80 percent RH. The charge at both 20 percent RH and 80 percent RH was more negative than the toner containing the charge control agent without treatment. The ratio of the charge at 20 percent RH to that at 80 percent RH was 2.2, lower than that for the toner containing the charge control agent without the fluorosilane treatment.

EXAMPLE S

100 Grams of PV FAST BLUE™ pigment were dispersed in 1 liter of absolute ethanol. 10.0 Grams of trifluoropropyltrichlorosilane were added to the solution with stirring at 25° C. The mixture was stirred at 300 rpm at 25° C. for 30 minutes. The entire mixture was then filtered using a laboratory vacuum filtration apparatus. The resulting pigment cake was washed with three 0.1 liter volumes of absolute ethanol.

EXAMPLE T

A ceramic boat containing 200 milligrams of BASF FANAL PINK™ D4830 carbon black was placed in a vessel connected to a vacuum pump until a vaccum of about 0.06 Torr was obtained. A vessel containing trifluoropropyltrichlorosilane was then connected to the first vessel containing the pigment/thereby causing the fluorosilane to be volatilized. 1.2 Torr of the silane was added in this manner. The pigment and silane were left for about 5 minutes, the excess was pumped off, a further 1.2 Torr of the silane was volatilized into the vessel containing the pigment, left for 7 minutes, then the excess was pumped off again. The entire process was at room temperature.

COMPARATIVE EXAMPLE U 2.5 grams of CONDUCTEX SC ULTRA™ carbon black were melt-mixed at 120° C. into 47.5 grams of SPAR™ polyester, a propoxylated bisphenol A fumarate, followed by micronization and jetting to form toner particles of 7.7 micron average volume diameter. The charge of the toner was measured at −11.9 microcoulombs per gram at 20 percent RH when charged for 30 minutes against a 90 micron diameter steel carrier that was coated with 80 percent by weight of polymethylmethacrylate and 20 percent by weight of VULCAN™ carbon black. The Example is tabulated in Table G.

COMPARATIVE EXAMPLE V

The procedure of Comparative Example U was followed, except that 2.5 grams of ACCUFLUOR 2010™ fluorinated carbon black were used in the place of CONDUCTEX SC ULTRA™, to form toner particles of 8.0 micron diameter.

The charging of this toner was measured at −8.0 microcoulombs per gram at 20 percent RH. The Example is tabulated in Table G. Compared to Comparative Example U, the fluorinated carbon black was not effective in raising the negative charge of the toner incorporating the carbon black.

EXAMPLE W

In an attritor containing 4 pounds of metal shot in cyclohexane were added 20 grams of CONDUCTEX SC ULTRA™, carbon black. After 30 minutes of attrition, 4 grams of octadecyl trichlorosilane were added into the suspension, and attrition was continued for a further 1 hour. During attrition, the temperature of the suspension was maintained between 10° C. and 30° C. The treated carbon black was removed from the attritor and dried at 80° C. 2.5 Grams of this treated carbon were then used instead of CONDUCTEX SC ULTRA™ to make an 8.7 micron diameter toner according to the procedure of Comparative Example U. The charging of this toner was measured at −16.3 microcoulombs per gram at 20 percent RH. The example is tabulated in Table G. Compared to Comparative Example U, this hydrocarbon silanated carbon black was effective in raising the negative charge of the toner incorporating the carbon black.

EXAMPLE X

In a 2 liter stainless steel beaker, 50 grams of CONDUCTEX SC ULTRA™ M carbon black were stirred into 600 grams of toluene. The beaker was placed in an ice bath, and slurry was homogenized at 3,000 rpm using polytron homogenizer. 25 Grams of (tridecafluoro-1,1,2,2-tetrahydrooctyl)-1-trichlorosilane were mixed with toluene in a 5:8 volume per volume ratio, then added to the toluene/carbon black slurry over a five minute interval. The slurry was homogenized for an additional five minutes. The material was then filtered using a laboratory vacuum filtration apparatus, and vacuum dried. 2.5 Grams of this treated carbon was then used instead of CONDUCTEX SC ULTRA™ to make a 6.8 micron diameter toner according to the procedure of Comparative Example U. The charging of this toner was measured at −29.6 microcoulombs per gram at 20 percent RH. The Example is tabulated in Table G. Compared to Comparative Example U, this fluorosilanated carbon black was effective in increasing the negative charge of the toner incorporating the carbon black. Compared to the hydrocarbon silanated carbon black of Example W, the fluorosilanated carbon black of this Example was more effective in increasing the negative charge of the toner incorporating the carbon black.

TABLE E

Triboelectric Charging of Fluorosilane Treated Toner Particles

| EXAMPLE | TONER TREATMENT | WT % OF ADDED FLUORO-SILANE | TONER CHARGE In Microcoulombs Per Gram | | CHARGE RATIO 20% RH 80% RH |
|---|---|---|---|---|---|
| | | | AT 20% RH | AT 80% RH | |
| Comparative Example O | None | 0 | −34 | −16 | 2.1 |
| Example P | $CF_3(CF_2)_5$—$(CH_2)_2SiCl_3$ | 15 | −65 | −42 | 1.5 |

TABLE F

Triboelectric Charging of Fluorosilane Treated Charge Control Agent Particles

| EXAMPLE | CONTROL AGENT PARTICLE TREATMENT | TONER CHARGE In Microcoulombs Per Gram | | CHARGE RATIO 20% RH 80% RH |
|---|---|---|---|---|
| | | AT 20% RH | AT 80% RH | |
| Comparative Example Q | None | −23 | −9 | 2.4 |

TABLE F-continued

Triboelectric Charging of Fluorosilane Treated Charge Control Agent Particles

| EXAMPLE | CONTROL AGENT PARTICLE TREATMENT | TONER CHARGE In Microcoulombs Per Gram | | CHARGE RATIO 20% RH 80% RH |
|---|---|---|---|---|
| | | AT 20% RH | AT 80% RH | |
| Example R | $CF_3(CF_2)_5-(CH_2)_2SiCl_3$ | −30 | −13 | 2.2 |

TABLE G

Triboelectric Charging of Toners Containing Solution Phase Silane Treated Carbon Blacks

| TONER | CARBON BLACK | CARBON BLACK SILANE TREATMENT | TONER CHARGE AT 20% RH IN MICROCOULOMBS PER GRAM |
|---|---|---|---|
| Comparative Example U | SC Ultra | None | −11.9 |
| Comparative Example V | Accufluor 2010 Fluorinated Carbon Black | None | −8.0 |
| Example W | Hydrocarbon Silane Treated SC Ultra | $CH_3(CH_2)_{17}SiCl_3$ | −16.3 |
| Example X | Fluorosilane treated SC Ultra | $CF_3(CF_2)_7(CH_2)_2SiCl_3$ | −29.6 |

Other modifications of the present invention may occur to those skilled in the art subsequent to a review of the present application, and these modifications, including equivalents thereof, are intended to be included within the scope of the present invention.

What is claimed is:

1. A toner composition consisting essentially of resin and pigment particles wherein the pigment particles selected from the group consisting of carbon black, cyan, magenta, yellow and mixtures thereof are treated with a fluorosilane polymer wherein said polymer particles are coated with said fluorosilane polymer, and wherein said polymer encapsulates said pigment and wherein said polymer is free of any reaction with said pigment.

2. A toner composition in accordance with claim 1 wherein said treated fluorosilanated pigments are prepared by solution or gas phase methods, and wherein said polymer is free of any reaction with said pigment particles.

3. A toner composition in accordance with claim 2 wherein the solution method comprises dispersing pigment particles in a suitable solvent; adding a fluorosilane to effect the fluorosilanation reaction and enable formation of said coating; and subsequently optionally filtering, washing, and drying the coated fluorosilane pigment.

4. A toner composition in accordance with claim 2 wherein the gas phase method comprises adding the pigment particles to a suitable reactor, and then introducing thereto a fluorosilane vapor under vacuum; or alternatively introducing the fluorosilane vapor with a carrier gas to effect a fluorosilanation reaction and enable formation of said coating.

5. A toner composition in accordance with claim 1 where the fluorosilanated pigment is a fluorosilanated carbon black with a resistivity of about 0.1 (ohm-cm)$^{-1}$.

6. A toner composition in accordance with claim 1 with a triboelectric charge of from about negative 5 to about negative 60 microcoulombs per gram of toner particles.

7. A toner composition in accordance with claim 2 further containing a charge additive present in an amount of from about 0.05 to about 5 weight percent.

8. A toner composition in accordance with claim 2 with an admix time of less than about 15 seconds.

9. A toner composition in accordance with claim 2 with an admix time of from about 1 to about 14 seconds.

10. A toner composition in accordance with claim 2 with a triboelectric charge of from about 10 to about 40 microcoulombs per gram.

11. A toner composition in accordance with claim 2 wherein the resin is selected from the group consisting of styrene polymers, polyesters, and mixtures thereof.

12. A toner composition in accordance with claim 1 further containing a wax component with a weight average molecular weight of from about 1,000 to about 10,000.

13. A toner composition in accordance with claim 12 wherein the wax component is selected from the group consisting of polyethylene and polypropylene.

14. A toner composition in accordance with claim 1 containing external additives selected from the group consisting of metal salts of a fatty acid, colloidal silicas, metal oxides, and mixtures thereof.

15. A toner composition in accordance with claim 2 wherein the pigment particles are selected from the group consisting of carbon black, magnetites, cyan, magenta, yellow, red, blue, green, brown, and mixtures thereof.

16. A developer composition comprised of the toner composition of claim 1 and carrier particles.

17. A developer composition comprised of the toner composition of claim 4 and carrier particles.

18. A developer composition in accordance with claim 16 wherein the carrier particles are comprised of ferrites, steel, or an iron powder.

19. A developer composition in accordance with claim 16 wherein the carrier particles are comprised of a core with a polymer coating thereover.

20. A developer composition in accordance with claim 19 wherein the coating is selected from the group consisting of a methyl terpolymer, a polyvinylidine fluoride, a polymethyl methacrylate, and a mixture of polymers not in close proximity in the triboelectric series.

21. A method of imaging which comprises formulating an electrostatic latent image on a photoreceptor, affecting development thereof with the toner composition of claim 1, and thereafter transferring the developed image to a suitable substrate.

22. A method of imaging in accordance with claim 21 wherein the transferred image is permanently fixed to the substrate.

23. A method of imaging which comprises formulating an electrostatic latent image on a positively charged photoreceptor, affecting development thereof with the toner composition of claim 3, and thereafter transferring the developed image to a suitable substrate.

24. A toner in accordance with claim 1 wherein said fluorosilanated pigment is passivated.

25. A toner in accordance with claim 1 wherein the fluorosilanated pigment possesses increased negative charging of about −0.1 to about −1.0 volt more negative contact potential as compared to a toner with a nonfluorosilanated pigment coating.

26. A toner in accordance with claim 1 wherein there results a negatively charging toner increase of from about 5 to 30 microcoulombs per gram as compared to a toner with resin and a nonfluorosilanated pigment coating.

27. A toner comprised of resin and a halosilane polymer coated pigment selected from the group consisting of carbon black, cyan, magenta, yellow and mixtures thereof and wherein said halosilane polymer is free of any reaction with said pigment.

28. A toner in accordance with claim 27 wherein the silane is a fluorosilane and the pigment is carbon black.

29. A toner composition consisting of resin and pigment particles wherein the pigment particles selected from the group consisting of carbon black, cyan, magenta, yellow and mixtures thereof are treated with a fluorosilane polymer wherein said pigment particles are coated with said fluorosilane polymer, and wherein said polymer encapsulates said pigment and wherein said polymer is free of any reaction with said pigment.

* * * * *